US012266459B2

(12) United States Patent
Grottenthaler et al.

(10) Patent No.: US 12,266,459 B2

(45) Date of Patent: Apr. 1, 2025

(54) CHOKE, AND METHOD FOR MANUFACTURING SUCH A CHOKE

(71) Applicant: Fronius International GmbH, Pettenbach (AT)

(72) Inventors: Patrick Grottenthaler, Pettenbach (AT); Andreas Resch, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 0 days.

(21) Appl. No.: 18/686,066

(22) PCT Filed: Jun. 9, 2023

(86) PCT No.: PCT/EP2023/065434

§ 371 (c)(1),
(2) Date: Feb. 23, 2024

(87) PCT Pub. No.: WO2023/237708

PCT Pub. Date: Dec. 14, 2023

(65) Prior Publication Data

US 2024/0428976 A1 Dec. 26, 2024

(30) Foreign Application Priority Data

Jun. 10, 2022 (EP) .................................... 22178352

(51) Int. Cl.

*H01F 27/06* (2006.01)
*H01F 3/02* (2006.01)

(Continued)

(52) U.S. Cl.

CPC ............... *H01F 27/06* (2013.01); *H01F 3/02* (2013.01); *H01F 3/14* (2013.01); *H01F 27/263* (2013.01); *H01F 27/306* (2013.01)

(58) Field of Classification Search

CPC ...................................................... H01F 27/06

(Continued)

(56) References Cited

U.S. PATENT DOCUMENTS 3,521,152 A * 7/1970 Emerson .................. G05F 3/06 336/215
3,587,020 A * 6/1971 Waasner ............... H01F 27/245 336/212

(Continued)

FOREIGN PATENT DOCUMENTS

DE 11 2012 002 017 T5 2/2014
DE 20 2015 102 905 U1 9/2016

(Continued)

OTHER PUBLICATIONS

International Search Report in PCT/EP2023/065434, mailed Sep. 20, 2023.

(Continued)

*Primary Examiner* — Ronald Hinson

(74) *Attorney, Agent, or Firm* — Collard & Roe, P.C.

(57) ABSTRACT

A choke includes at least one winding each having two connections, and a magnetic core having an air gap, wherein a coil body made up of at least two parts is provided for receiving the at least one winding, and a base plate that can be connected to the coil body is also provided. The at least two parts of the coil body and the base plate include first latching elements and second latching elements for tool-free connecting the at least two parts of the coil body and for tool-free connecting the base plate to the coil body, and the magnetic core is built up from sheets stacked one on top of the other, and the base plate is designed to receive the sheets of the magnetic core.

13 Claims, 8 Drawing Sheets

Figure 1:
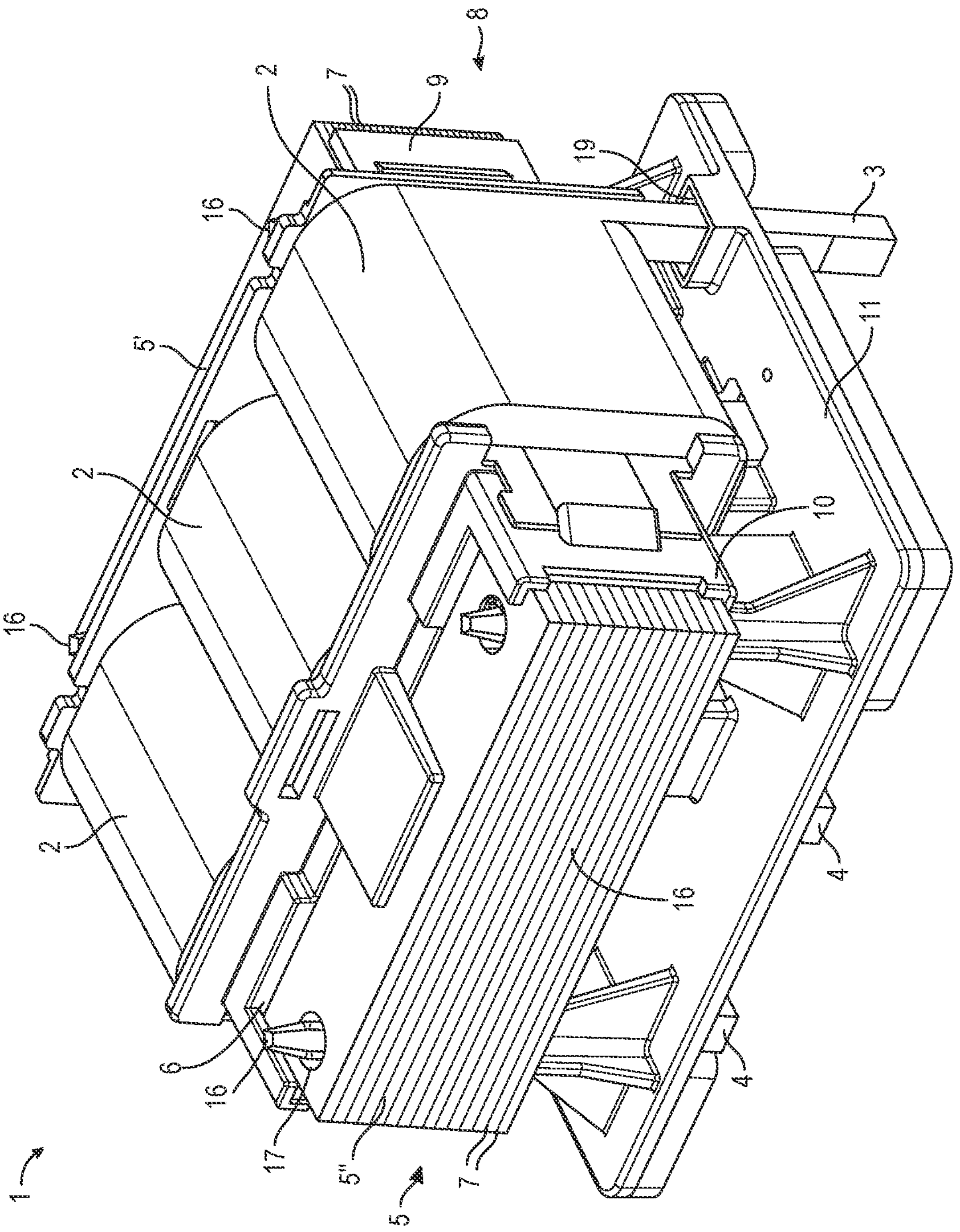

(51) Int. Cl.
*H01F 3/14* (2006.01)
*H01F 27/26* (2006.01)
*H01F 27/30* (2006.01)

(58) Field of Classification Search
USPC ............................................................ 336/65
See application file for complete search history.

(56) References Cited

U.S. PATENT DOCUMENTS 4,480,377 A * 11/1984 House ................. H01F 41/0233 336/216
4,897,916 A * 2/1990 Blackburn .......... H01F 41/0233 336/216
5,506,560 A * 4/1996 Takeuchi .............. H01F 27/255 336/212
5,996,214 A * 12/1999 Bell ...................... H01F 27/266 29/605
6,100,783 A * 8/2000 Hopkinson ........... H01F 27/245 336/216
7,557,687 B2 * 7/2009 Watanabe ............. H01F 27/346 336/234
8,525,631 B2 * 9/2013 Balog ..................... H01F 38/14 336/212
9,484,139 B2 11/2016 Yamada et al.
9,646,760 B2 * 5/2017 Imanishi ................... H01F 5/02
10,770,217 B2 9/2020 Aarab
2003/0098769 A1 * 5/2003 Cheung ................. H01F 27/306 336/208
2009/0066290 A1 * 3/2009 Altekruse ............. H01F 27/325 320/108
2014/0266527 A1 9/2014 Vafakhah et al.
2024/0304381 A1 * 9/2024 Rylko ................... H01F 27/306

FOREIGN PATENT DOCUMENTS

EP 3 255 642 B1 12/2019
WO 2018/033451 A1 2/2018

OTHER PUBLICATIONS

European Search Report dated Dec. 13, 2022 in European Application No. 22178352.5, with English translation of the relevant parts.
PCT—International Preliminary Report on Patentability (with Notification), of International Application No. PCT/EP2023/065434, Dated Dec. 19, 2024 (English translation).

* cited by examiner

CHOKE, AND METHOD FOR MANUFACTURING SUCH A CHOKE

CROSS REFERENCE TO RELATED APPLICATIONS

This application is the National Stage of PCT/EP2023/065434 filed on Jun. 9, 2023, which claims priority under 35 U.S.C. § 119 of European Application No. 22178352.5 filed on Jun. 10, 2022, the disclosure of which is incorporated by reference. The international application under PCT article 21(2) was not published in English.

The invention relates to a choke comprising at least one winding each having two connections, and a magnetic core provided with an air gap, wherein a coil body consisting of at least two parts is provided for receiving the at least one winding, and a base plate that can be connected to the coil body is also provided.

The invention also relates to a method for manufacturing or assembling such a choke.

A choke is a coil or inductor for limiting currents in electric lines, for temporarily storing energy, for impedance matching or for filtering. Such chokes with a magnetic core are used for various functions, in particular in more powerful electrical devices. To avoid saturation, the magnetic core comprises an air gap.

Such chokes are used, for example, in inverters, in particular photovoltaic inverters, in the power unit, for example as output filter chokes. Such chokes are also used in welding devices, battery chargers but also in other electrical devices.

WO 2018/33451 A1 describes a differential mode power choke in which at least two choke units are connected to one another via a magnetic shunt in order to reduce magnetic stray fields. A screw joint is necessary for the assembly of the chokes.

In DE 20 2015 102 905 U1, a coil body for a transformer is protected, which contains latching elements on the end faces of the flange regions, on which latching elements further coil bodies can be mechanically coupled to one another. The structure of the individual coil bodies is not described in detail.

Chokes of the same type are known, for example, from US 2003/0098769 A1, US 2014/0266527 A1 or DE 11 2012 002 017 T5. The structure and manufacture or assembly of the components is complex and, moreover, requires the use of adhesives, tools or other auxiliaries.

Chokes, the magnetic core of which consists of a plurality of sheets stacked one on top of the other, in particular made of iron or another magnetic material, are usually manufactured and mounted by screwing the packages of sheets with the aid of screws and pressure plates. In addition, a so-called air gap plate made of non-magnetic material is often added in the legs of the magnetic core in order to be able to implement a defined air gap. The labour effort and thus the labour costs for the assembly of the sheets of the magnetic core during the manufacture and assembly of the choke are very high. Moreover, there are costs involved for the screws, pressure plates and the air gap plate.

The object of the present invention is to provide a choke and a method for manufacturing such a choke, whereby a choke can be manufactured or assembled as quickly and simply as possible and as far as possible without additional parts. Disadvantages of known chokes, which have to be manufactured with relatively great effort, should be avoided or at least reduced.

The object according to the invention is achieved by an above-mentioned choke, wherein the at least two parts of the coil body and the base plate comprise first latching elements and second latching elements for tool-free connecting, the at least two parts of the coil body and for tool-free connecting, the base plate to the coil body, and the magnetic core is built up from a plurality of sheets stacked one on top of the other, and the base plate is designed to receive the sheets of the magnetic core. According to the invention, a coil body is created from at least two parts and a base body, which hold the at least one winding and the sheets of the magnetic core and can be tool-free connected to one another via the corresponding first and second latching elements. The sheets of the magnetic core are held in the desired position by the parts of the coil body and the base plate, without the need for fastening screws and corresponding tools. At the same time, the parts of the coil body and the base plate are configured in such a way that the desired air gap in the magnetic core is maintained, without the need for the arrangement of its own air gap plate. By configuring the latching elements accordingly, a simple and quick tool-free connection of the at least two parts of the coil body can be achieved after the at least one winding of the choke has been received. The base plate of the choke and the at least two parts of the coil body also preferably comprise latching elements for tool-free connecting the base plate to the coil body. In this way, the magnetic core consisting of the sheets stacked one on top of the other can be assembled in the correct position without the use of additional fastening elements, such as fastening screws, and can be held in this position after the base plate has been connected to the coil body. Thus, the choke can be manufactured or assembled particularly quickly and easily. Depending on the configuration of the parts of the coil body and the base plate and the first and second latching elements, if appropriate, it may also be possible to separate the base plate from the coil body and the parts of the coil body again and thus to disassemble the choke. Here, the disassembly preferably also takes place without tools. However, the latching elements can also be configured in such a way that only a one-time connection of the parts of the coil body and of the coil body to the main body is permitted. Often, however, assembled chokes are immersed in a lacquer or resin bath in order to insulate them and, above all, to protect the sheets of the magnetic core from corrosion. In this case, a disassembly of the choke is not intended and also not desired.

Each of the first latching elements can be formed by a latching lug and the second latching elements can be formed by an opening or a projection for receiving the latching lug. This represents a simple implementation of a tool-free connection.

Ideally, the coil body and the base plate are made of plastics, which has no influence on the magnetic field of the choke and causes an electrical insulation between the magnetic core and the at least one winding. Thus, the components of the choke can be manufactured easily and cost-effectively. The corresponding latching elements for connecting the parts of the coil body and for connecting the base plate to the coil body are preferably provided immediately during the manufacture of the parts of the coil body and the base plate, so that no complex subsequent processing of the components is necessary. When selecting the plastics, attention must be paid to easy processability and to certain properties, such as temperature resistance or flame retardant properties. For example, polyamide is suitable for the manufacture of the coil body and the base plate.

Here, the coil body and the base plate are preferably manufactured in an injection moulding process or 3D printing process. As a result, even more complex geometries of the components of the choke can be manufactured quickly and, at least in higher quantities, also cost-effectively.

If the base plate contains pins, and the sheets comprise corresponding openings for the assembly of the magnetic core, the sheets can be stacked one on top of the other in a simple manner on the pins and, above all, without tools, in order to form the magnetic core.

The pins of the base plate preferably comprise stiffening ribs. Such stiffening ribs give the pins the necessary stability even with a small material thickness and ensure the correct position of the sheets of the magnetic core by adapting the openings in the sheets accordingly to the contour of the pins in cross-section.

The magnetic core may consist of an E-shaped part and an I-shaped part, wherein the air gap is formed between the free ends of the E-shaped part and the I-shaped part. Depending on the embodiment of the choke, windings that produce the corresponding magnetic field can be arranged on one or all legs of the E-shaped magnetic core.

An edge for forming the air gap is arranged on at least one part of the coil body. Such an edge on at least a part of the coil body allows a defined air gap to be determined and maintained without the need for an air gap plate as its own component of the choke. Thus, the manufacture of the choke or its assembly is further simplified.

If openings for passing through the connections of the at least one winding are arranged in the base plate, the choke is quickly and easily mounted on a printed circuit board or the like with simple electrical bonding of the connections of the choke. The connections of the prefabricated windings protrude through these openings in the base plate and can be quickly and easily soldered to contact surfaces on a printed circuit board or connected via clamp connections.

According to a further feature of the invention, a part of the coil body contains elements for placing the at least one winding. As a result, the at least one prefabricated winding can be quickly arranged on these elements and the choke can be manufactured quickly and, above all, without tools. Additional centring elements are preferably provided, which correspondingly centre the at least one winding and determine its desired position.

The object according to the invention is also achieved by an above-mentioned method for manufacturing a choke, which comprises the following steps:

a) Placing and centring the at least one winding on the first part of the coil body;
b) tool-free connecting the first part of the coil body to the second part of the coil body;
c) inserting and stacking the sheets of the magnetic core into the coil body;
d) tool-free connecting the base plate to the coil body.

The choke can thus be manufactured quickly, easily and without tools, without the need for additional fastening elements, such as fastening screws, pressure plates or air gap plates. In addition to the lower manufacturing effort, the material costs can also be reduced. With regard to the further advantages, reference is made to the above description of the choke.

Advantageously, before tool-free connecting the base plate to the coil body, the base plate with the pins is moved through the openings in the sheets. As a result, the magnetic core can be assembled and held in its desired position without the use of fastening screws.

Advantageously, the tool-free connection of the first part of the coil body to the second part of the coil body and the tool-free connection of the base plate to the coil body is done by snapping latching lugs into corresponding openings on the parts of the coil body and the base plate.

If the assembled choke is immersed in a lacquer bath, in particular a bath of water-based lacquer, and preferably dried at a more elevated temperature, in particular 100° C. to 150° C., the choke can be isolated and protected from environmental effects and corrosion. Solvent-based lacquers can be used. In addition, the assembled choke can also be coated with or embedded in resins.

The present invention is explained in more detail with reference to the attached drawings, which show an embodiment of the invention to which it is not intended to be limited, and in which FIG. 1 is a perspective view of a choke structured according to the invention with an E-shaped magnetic core; and FIGS. 2-8 are different views of the choke according to FIG. 1 at different manufacturing stages.

FIG. 1 illustrates a perspective view of a choke 1 structured according to the invention with an E-shaped magnet core 5. The choke 1 illustrated includes three windings 2, each having two connections 3, 4. The magnetic core 5 is built up from a plurality of sheets 7 stacked one on top of the other, in particular made of iron or an iron alloy. The magnetic core 5 consists of an E-shaped part 5' and an I-shaped part 5'', wherein an air gap 6 having a defined width is arranged between the free ends of the legs of the E-shaped part 5' and the I-shaped part 5''. On the legs of the E-shaped part 5'' of the magnetic core 5 there are arranged the three windings 2, which produce a corresponding magnetic field when current flows through the windings 2. Furthermore, a coil body 8, preferably made of plastic, is provided for receiving the windings 2. In order to ensure the arrangement of the windings 2 and subsequently their hold, the coil body 8 is built up of at least two parts 9, 10, which can be connected to one another. Furthermore, a base plate 11 is provided, which too is preferably made of plastic and is used to receive the sheets 7 of the magnetic core 5. The base plate 11 can be connected to the coil body 8 or at least a part 9, 10 of the coil body. For tool-free connecting the at least two parts 9, 10 of the coil body 8 and for tool-free connecting the coil body 8 to the base plate 11, first latching elements 12, 14 and second latching elements 13, 15 are arranged on the parts 9, 10 of the coil body 8 and the base plate 11 (see FIGS. 2 to 8).

The base plate 11 preferably contains pins 16, on which the sheets 7 having corresponding openings 17 can be stacked one on top of the other to build up the magnetic core 5.

Figure 7:
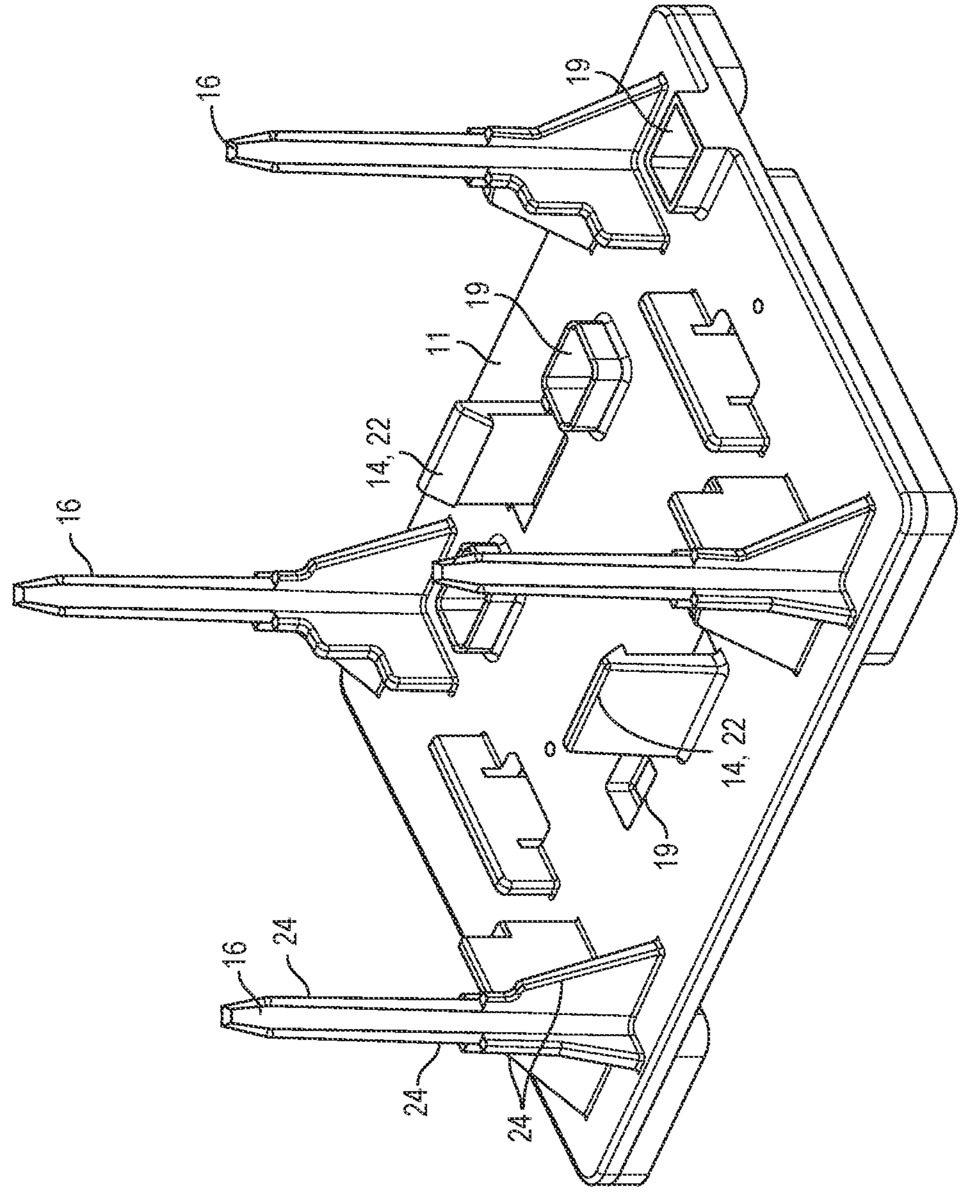

The pins may comprise stiffening ribs 24 (see FIG. 7). Furthermore, openings 19 for passing through the connections 3, 4 of the windings 2 can be arranged in the base plate 11.

The illustrated choke 1 can be assembled or manufactured very easily and quickly without tools, without the need for fastening screws, pressure plates or air gap plates.

The method for manufacturing the choke according to FIG. 1 is described in more detail with reference to FIGS. 2 to 8.

Figure 2:
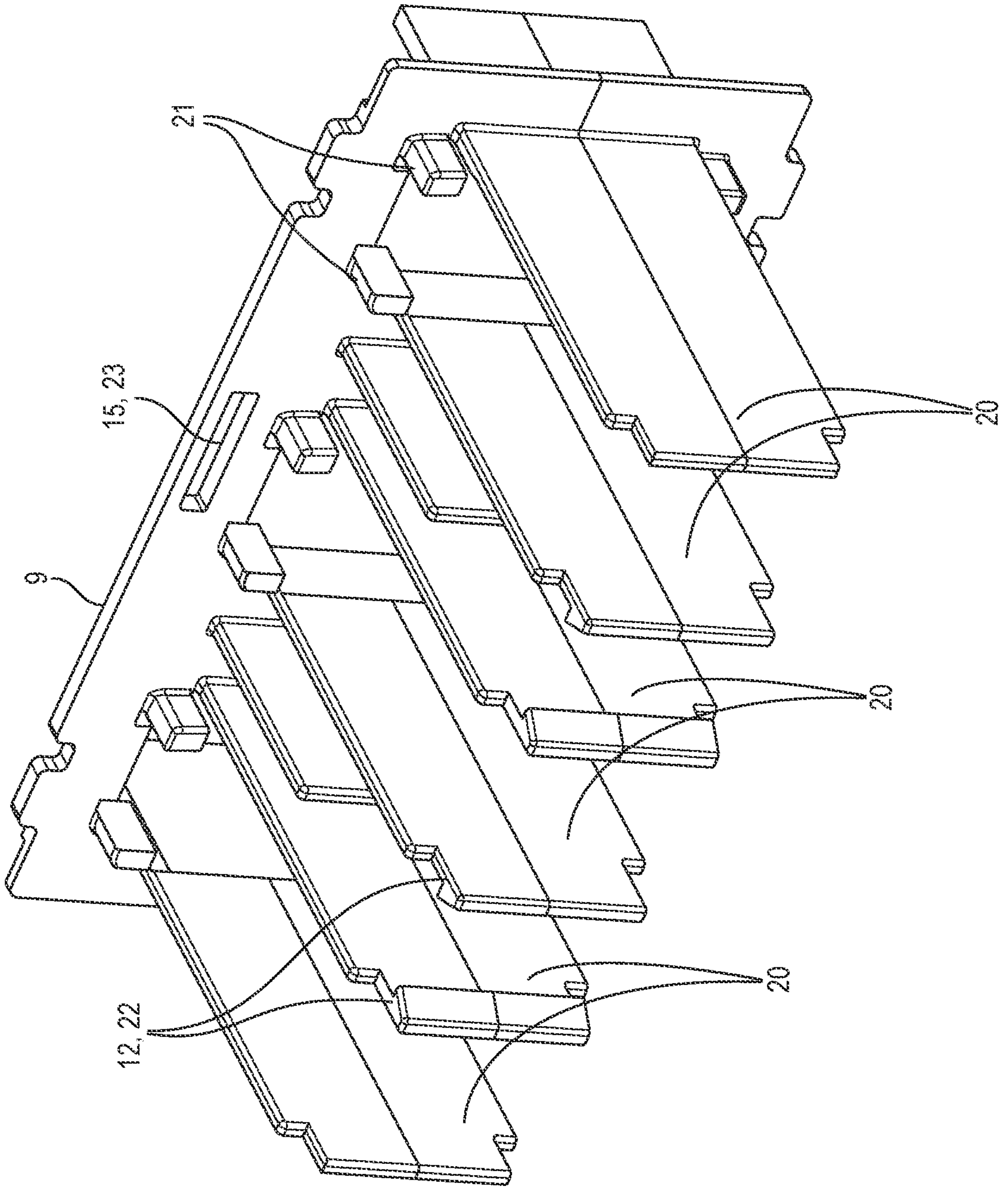

FIG. 2 illustrates a part 9 of the coil body 8, which is used to receive the windings 2. The part 9 of the coil body is preferably made of plastic by injection moulding or 3D printing. In addition to the elements 20 for receiving the windings 2, first latching elements 12 and second latching elements 15 are arranged for connection to the second part 10 of the coil body 8 and for connection to the base plate 11 (see FIGS. 4 and 8). The first latching elements 12 for connection to the second part 10 of the coil body 8 are formed by corresponding latching lugs 22. The second latching element 15 for connecting the part 9 of the coil body 8 to the base plate 11 is formed by an opening 23. Furthermore, centring elements 21, by means of which the windings 2 are centred and held in the desired position, are provided on the part 9 of the coil body 8.

Figure 3:
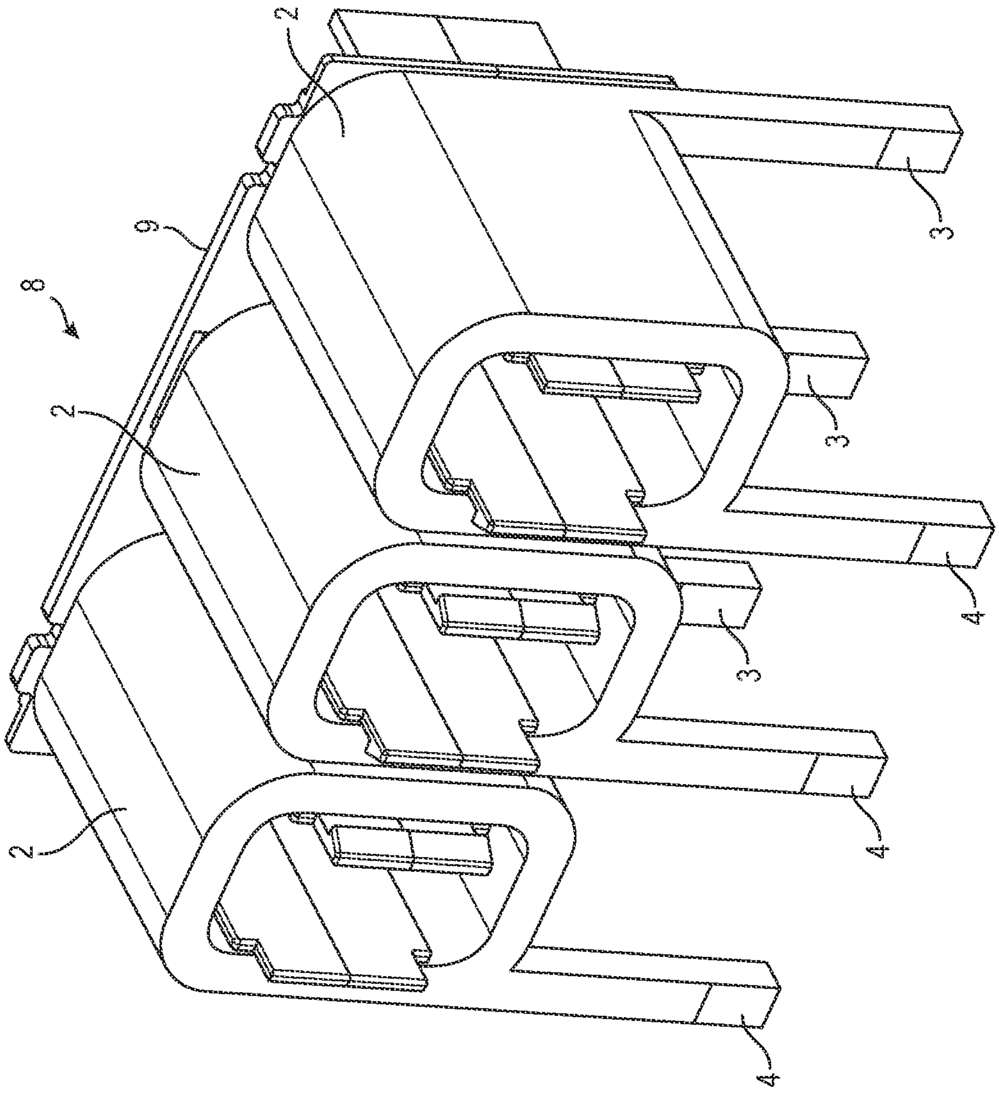

FIG. 3 shows the part 9 of the coil body 8 with arranged windings 2. The three windings 2 are slid onto the elements 20 of the part 9 and held in the desired position by the centring elements 21 (see FIG. 2). The connections 3, 4 of the windings 2 protrude downward and can later be soldered, for example, to a printed circuit board (not shown).

Figure 4:
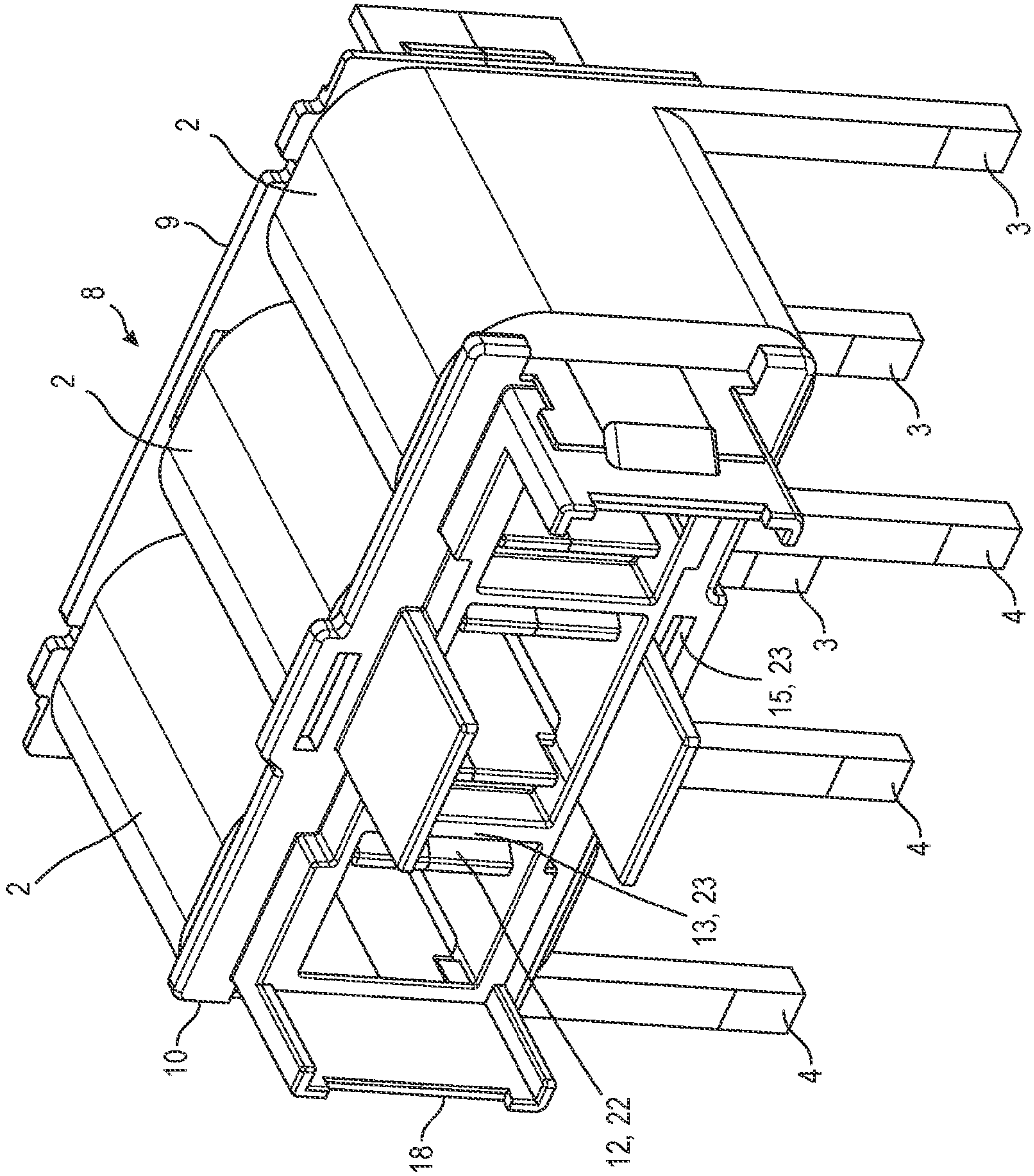

According to FIG. 4, the second part 10 of the coil body 8 is tool-free connected to the part 9. To this end, second latching elements 13 are provided on the part 10, which are configured to be complementary to the first latching elements 12 of the first part 9 of the coil body 8. In the exemplary embodiment illustrated, the second latching elements 13 on the part 10 of the coil body 8 are configured to be connected to the part 9 by openings 23 or projections into which the first latching elements 12 of the part 9, designed as latching lugs 22, snap. To connect the coil body 8 to the base plate 11, corresponding second latching elements 15, for example in the form of an opening 23 or a projection for receiving a latching lug 22 on the base plate 11, are also arranged on the part 10.

Figure 5:
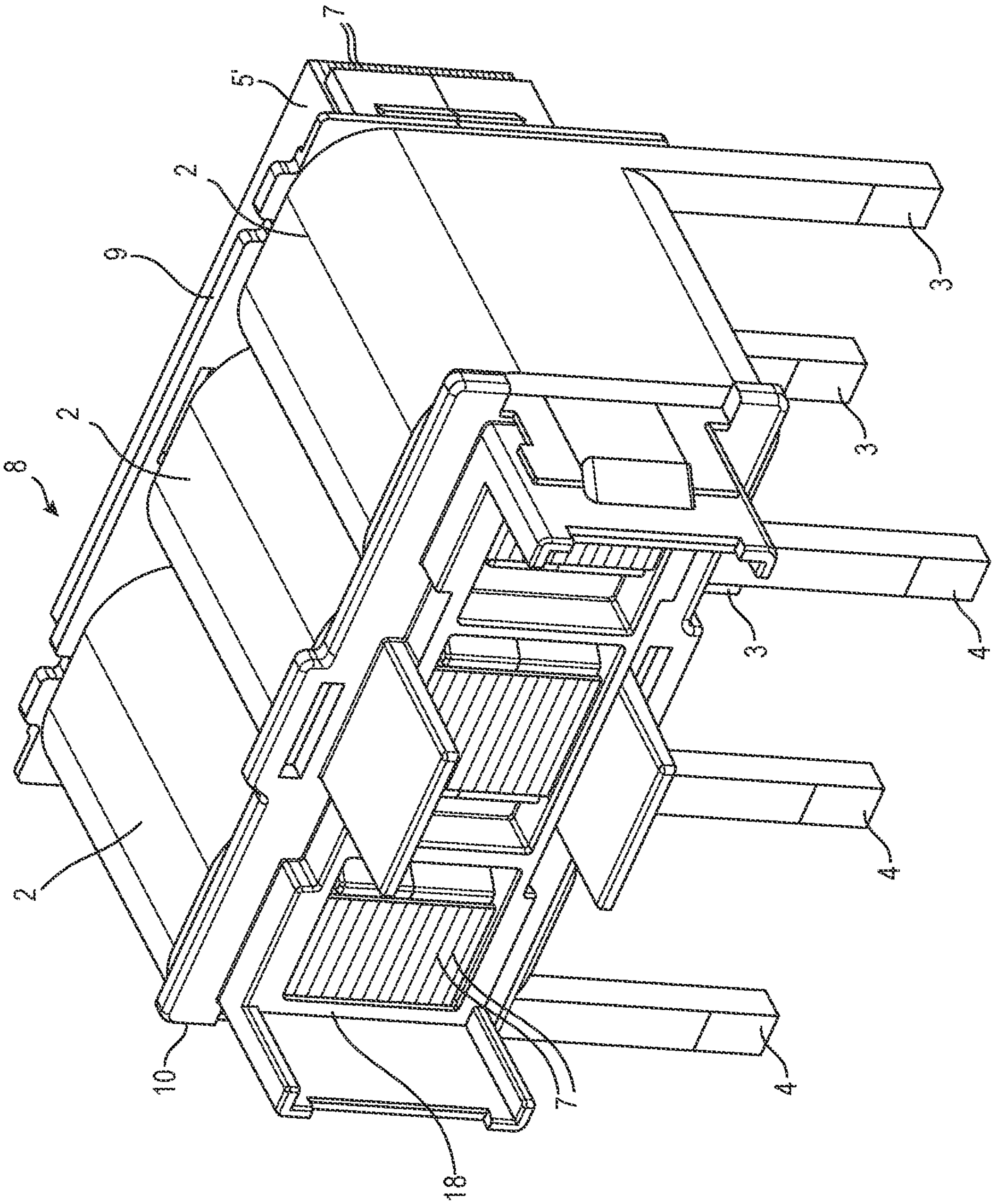

In the stage of manufacturing the choke 1 according to FIG. 5, the sheets 7 are arranged to form the E-shaped part 5' of the magnetic core 5. To form an air gap to the I-shaped part 5" of the magnetic core 5, the part 10 of the coil body 8 comprises an edge 18.

Figure 6:
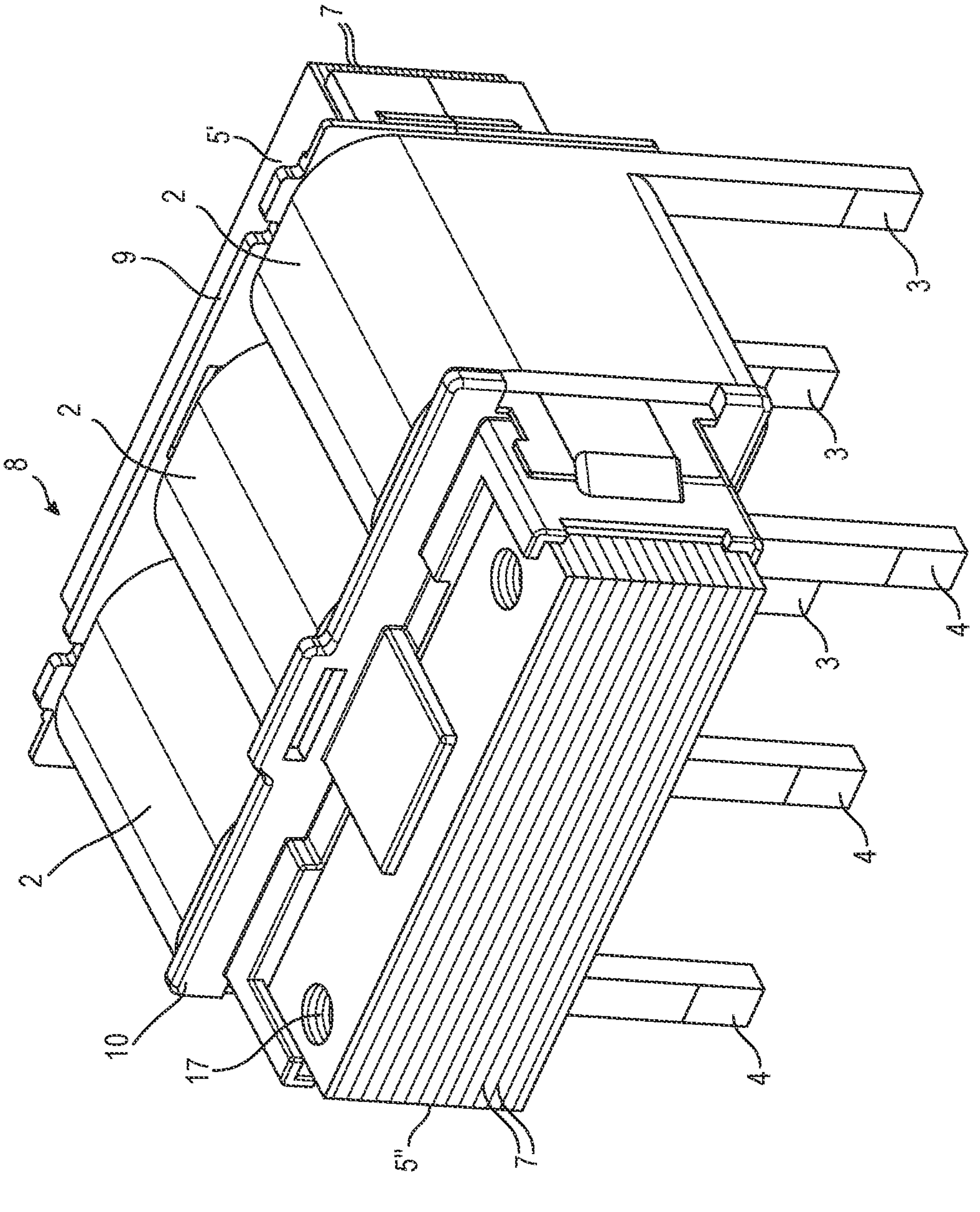

If, according to FIG. 6, the sheets 7 for forming the I-shaped part 5" of the magnetic core 5 are arranged on the part 10 of the coil body 8, the edge 18 on the part 10 ensures that an air gap 6 between the E-shaped part 5' and the I-shaped part 5" of the magnetic core 5 is maintained with a defined width.

FIG. 7 shows a base plate 11 of the choke according to the invention, which too is preferably made of plastic by injection moulding or 3D printing. The base plate 11 comprises pins 16, which preferably have stiffening ribs 24. In addition openings 19 for passing through the connections 3, 4 of the windings 2 are arranged in the base plate. The stiffening ribs 24 of the pins 16 are configured such that the sheets 7 can be arranged with corresponding openings 17 to form the magnetic core 5.

Figure 8:
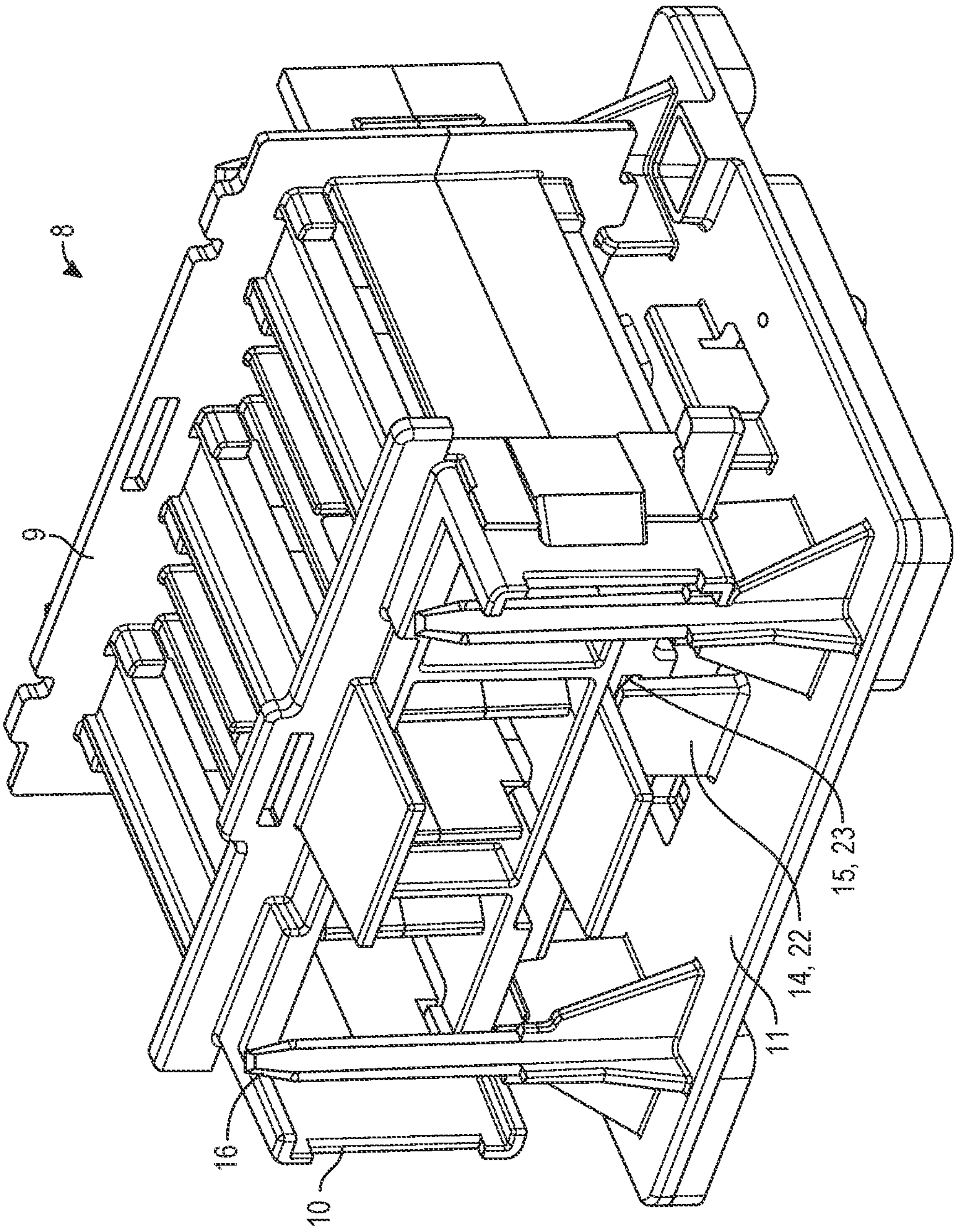

FIG. 8 illustrates how the base plate 11 is tool-free connected to the parts 9, 10 of the coil body 8. Here, the windings 2 and sheets 7 of the magnetic core 5 have been hidden for the sake of better visibility. The connection of the base plate 11 to the parts 9, 10 of the coil body is made via the first latching elements 14 and the second latching elements 15, which are formed, for example, by latching lugs 22 and openings 23. The arrangement of the windings 2 and sheets 7 of the magnetic core 5 results in the choke 1 according to FIG. 1.

The present invention enables quick and tool-free manufacture of a choke 1 comprising at least one winding 2 and a magnetic core 5, which is interrupted by an air gap 6, without additional elements.

The invention claimed is:

1. A choke (1) comprising at least one winding (2) each having two connections (3, 4), and a magnetic core (5) provided with an air gap (6), wherein a coil body (8) comprising at least two parts (9, 10) is provided for receiving the at least one winding (2), and a base plate (11) that can be connected to the coil body (8) is also provided, wherein, the at least two parts (9, 10) of the coil body (8) and the base plate (11) comprise first latching elements (12, 14) and second latching elements (13, 15) for tool-free connecting the at least two parts (9, 10) of the coil body (8) and for tool-free connecting the base plate (11) to the coil body (8), and wherein the magnetic core (5) is built up from a plurality of sheets (7) stacked one on top of the other, and the base plate (11) is designed to receive the sheets (7) of the magnetic core (5).

2. The choke (1) according to claim 1, wherein each of the first latching elements (12, 14) are formed by a latching lug (22) and the second latching elements (13, 15) are formed by an opening or a projection (23) for receiving the latching lug (22).

3. The choke (1) according to claim 1, wherein the coil body (8) and the base plate (11) are made of plastic.

4. The choke (1) according to claim 3, wherein said coil body (8) and said base plate (11) are manufactured in an injection molding process or a 3D printing process.

5. The choke (1) according to claim 1, wherein the base plate (11) contains pins (16), and the sheets (7) comprise corresponding openings (17) for building up the magnetic core (5), so that the sheets (7) can be stacked one on top of the other on the pins (16), wherein the pins (16) preferably comprise stiffening ribs (24).

6. The choke (1) according to claim 1, wherein the magnetic core (5) comprises an E-shaped part (5') and an I-shaped part (5"), wherein the air gap (6) is formed between the free ends of the E-shaped part (5') and the I-shaped part (5").

7. The choke (1) according to claim 6, wherein an edge (18) for forming the air gap (6) is arranged on at least one part (9, 10) of the coil body (8).

8. The choke (1) according to claim 1, wherein openings (19) for passing through the connections (3, 4) of the at least one winding (2) are arranged in the base plate (11).

9. The choke (1) according to claim 1, wherein a part (9) of the coil body (8) contains elements (20) for placing the at least one winding (2), wherein additional centering elements (21) are preferably provided for centering the at least one winding (2).

10. A method of manufacturing the choke (1) according to claim 1, the method comprising the steps of:

a) placing and centering the at least one winding (2) on the first part (9) of the coil body (8);

b) tool-free connecting the first part (9) of the coil body (8) to the second part (10) of the coil body (8);

c) inserting and stacking the sheets (7) of the magnetic core (5) into the coil body (8);

d) tool-free connecting the base plate (11) to the coil body (8).

11. The method for manufacturing a choke (1) according to claim 10, wherein before tool-free connecting the base plate (11) to the coil body (8), the base plate (11) with the pins (16) is moved through the openings (17) in the sheets (7).

12. The method according to claim 10, wherein tool-free connecting the first part (9) of the coil body (8) to the second part (10) of the coil body (8) and tool-free connecting the base plate (11) to the coil body (8) are done by snapping latching lugs (22) into corresponding openings (23) on the parts (9, 10) of the coil body (8) and the base plate (11).

13. The method according to claim 10, wherein the assembled choke (1) is immersed in a lacquer bath, in particular a bath of water-based lacquer, and is preferably dried at a more elevated temperature, in particular 100° C. to 150° C.

* * * * *